United States Patent
Takahashi

(10) Patent No.: US 6,937,267 B1
(45) Date of Patent: Aug. 30, 2005

(54) ELECTRONIC ENDOSCOPE

(75) Inventor: Tadashi Takahashi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/467,152

(22) Filed: Dec. 20, 1999

(30) Foreign Application Priority Data

Dec. 22, 1998 (JP) .......................................... P10-364892

(51) Int. Cl.$^7$ .............................. H04N 7/08; H04N 9/47
(52) U.S. Cl. ........................................................ 348/65
(58) Field of Search .............................. 348/45, 65, 69, 348/72, 74, 76; 382/128, 131; 600/46, 180, 181, 109, 317

(56) References Cited

U.S. PATENT DOCUMENTS

| | | | | |
|---|---|---|---|---|
| 4,044,546 A | * | 8/1977 | Koike | 368/70 |
| 4,226,443 A | * | 10/1980 | Brown | 283/2 |
| 4,846,155 A | * | 7/1989 | Kimura | 600/109 |
| 5,305,098 A | * | 4/1994 | Matsunaka et al. | 348/65 |
| 5,408,996 A | * | 4/1995 | Salb | 600/317 |
| 5,772,212 A | * | 6/1998 | Hagedorn | 273/299 |
| 6,080,104 A | * | 6/2000 | Ozawa et al. | 600/180 |
| 6,120,435 A | * | 9/2000 | Eino | 600/118 |
| 6,249,362 B1 | * | 6/2001 | Sato et al. | 358/527 |
| 2001/0002946 A1 | * | 6/2001 | Yamagata et al. | 386/95 |

FOREIGN PATENT DOCUMENTS

JP 9-154811 6/1997

* cited by examiner

*Primary Examiner*—Chris Kelley
*Assistant Examiner*—Behrooz Senfi
(74) *Attorney, Agent, or Firm*—Greenblum & Bernstein, P.L.C.

(57) ABSTRACT

An electronic endoscope displays the date so as to enable the year, month, and day to be differentiated on a screen when displaying a date together with the object image. The electronic endoscope is provided with, in a processor, a central processing unit (CPU), a real time clock (RTC), a cathode ray tube controller (CRTC) and a character generator read only memory (CG-RORM) and, on the outside, a keyboard and monitor. A date is read from the RTC and a character code corresponding to the year, month, and day to be displayed on the screen of the monitor is read from the CG-ROM at the CRTC. The character code is transmitted as a character signal to the monitor, and the date is displayed on the screen along with the object image, the month being displayed by a green color and the year and day by a white color at this time.

27 Claims, 19 Drawing Sheets

DISPLAY A

CASE OF DISPLAY ORDER OF YEAR, MONTH, AND DAY

DISPLAY B

CASE OF DISPLAY ORDER OF MONTH, DAY, AND YEAR

DISPLAY C

CASE OF DISPLAY ORDER OF DAY, MONTH, AND YEAR

FIG. 7

CHARACTER CODE TABLE T

| UPPER / LOWER | (A) 3H | (B) BH | (C) FH |
|---|---|---|---|
| 0 | (30H) 0 | (B0H) 0 | (F0H) *0* |
| 1 | (31H) 1 | (B1H) 1 | (F1H) *1* |
| 2 | (32H) 2 | (B2H) 2 | (F2H) *2* |
| ⋮ | ⋮ | ⋮ | ⋮ |
| 8 | (38H) 8 | (B8H) 8 | (F8H) *8* |
| 9 | (39H) 9 | (B9H) 9 | (F9H) *9* |
| COLOR | WHITE | GREEN | WHITE |

(NUMERICAL EXPRESSION OF MONTH)

Z7D — Dec / 13 / 98

ITALICS

CHARACTER CODE TABLE T'

| | (A) | (B) | (C) | (D) |
|---|---|---|---|---|
| UPPER / LOWER | 3H | AH | BH | FH |
| 0 | 0 | 0 | 0 | *0* |
| 1 | 1 | 1 | 1 | *1* |
| 2 | 2 | 2 | 2 | *2* |
| ⋮ | ⋮ | ⋮ | ⋮ | ⋮ |
| 8 | 8 | 8 | 8 | *8* |
| 9 | 9 | 9 | 9 | *9* |
| COLOR | WHITE | YELLOW | GREEN | WHITE |

ELECTRONIC ENDOSCOPE

BACKGROUND OF THE INVENTION

1. Field of the Invention

The present invention relates to an electronic endoscope for inserting a video-scope into the stomach or other body cavity and displaying an image of the body cavity on a monitor for examination.

2. Description of the Related Art

Conventionally, there is known an electronic endoscope which can display a patient's name or date along with the image of a body cavity on a screen. In this electronic endoscope, the current date is read from a central processing unit (CPU) to enable the date of examination to be displayed on the screen by numerals in the order of the year, month, and day. Further, considering the differences in how dates are read in other countries, the display of the date "98/12/10" can be changed to a display of "12/10/98" (month, day, and year) or "10/12/98" (day, month, and year). Further, along with the date, the image of the body cavity (still image) is stored in an electronic file such as a magneto-optic disc, a magnetic disk and so on. After that, when the image of the body cavity is reproduced and displayed, the date of examination is confirmed on the screen.

The date to be displayed on the screen is displayed in completely the same color. Therefore, in some cases it is not possible for one viewing the screen to clearly determine the month and day in the date displayed on the screen. In particular, when storing the image of the body cavity along with the date in the image storage device and then much later displaying the image of the body cavity on the screen, it is difficult for one viewing the screen to distinguish between the month and day. For example, when the image of the body cavity is stored and the date "12/10/98" (Dec. 10, 1998) had been displayed on the screen, if the image of the body cavity is reproduced and displayed after several months, it cannot be determined by one viewing the screen if the stored date is December 10 or October 12 and therefore the stored date is liable to be misread.

Further, after the year 2000 (in particular 2000 to 2031), if the year is displayed by the last two digits, determination by the viewer between the year, month, and day will become even more difficult. For example, when displaying the date "02/12/10" for Dec. 10, 2002 on the screen, determination of the year, month, and day will be difficult.

SUMMARY OF THE INVENTION

An object of the present invention is to provide an electronic endoscope in which the year, month, and day can be easily differentiated on a screen on which a date is output and displayed along with the image of the body cavity.

According to the present invention, there is provided a data generating device, provided in an electronic endoscope, the device generating an image data corresponding to an object image obtained by the electronic endoscope, and character information including a date when the object image was obtained. The device includes a date-differentiating processor that generates the character information so that at least one of the year, month, and day is differentiated when the date is displayed on a screen of a display device along with the object image.

Thus, when the date and the image, stored in an electronic file, are read therefrom and displayed on a screen of a display device, for example, several months or years after the recording date, at least one of the year, month, and day can be easily recognized by one viewing the screen.

The date-differentiating processor preferably sets one of the year, month, and day to a color or character type different from the others. Alternatively, the date-differentiating processor sets one of the year, month, and day to a color or character type different from the others only for the period of the date setting operation. Due to this, either one of the year, month, and day can be easily recognized.

The date-differentiating processor preferably sets the mode of display of the year, month, and day so as to enable at least one of the month and day in the year, month, and day to be differentiated. For example, it preferably sets one of the month and day in the year, month, and day displayed by numerals to a different color.

The date-differentiating processor preferably sets one of the month and day of the year, month, and day to be displayed, to a different character type. For example, the date-differentiating processor preferably sets the month of the year, month, and day to be displayed as letters. Alternatively, the date-differentiating processor sets one of the month and day of the year, month, and day displayed by numerals to a different font.

The date-differentiating processor preferably sets one of the month and day of the year, month, and day to be displayed by numerals to a different color for exactly the period of setting the date. Due to this differentiation, when setting the date, there is no chance of misreading the date by one viewing the screen.

Preferably, the date-differentiating processor sets the year, month, and day to be displayed by numerals to respectively different colors. Because of this feature, there is no chance of mistaking the date particularly when viewing the display of the date after the year 2000. Further, the date to be displayed on the screen preferably can be displayed by at least one display order of the year, month, and day; month, day, and year; and day, month, and year. In this case, the display order preferably can be changed on the screen by a switching operation of the display order. Thus, the device becomes applicable to display formats in countries including Japan, the United States and European countries.

The object image and date to be displayed on the screen is preferably stored as a single image in an image storage device. The image stored in the image storage device is at least reproduced and displayed on a screen or additionally output as hard copy.

The display processor may include a character code output processor that outputs a character code corresponding to the date, and a character signal generating processor that generates a character signal in accordance with the character code output by the character code output processor, the character signal being output, along with a video signal corresponding to the object image, to a monitor provided outside the electronic endoscope, so that the object image is displayed on the screen and the date is displayed at a predetermined position on the screen. In this case, the date-differentiating processor preferably outputs the character code in such a manner that one of the year, month, and day, which should be differentiated from the others, is displayed in a mode of display which is different from that of the others.

Further, according to the present invention, there is provided an electronic endoscope including a display processor that displays a year, month, and day of a date along with an object image on a screen, and a storing processor that stores the date along with the object image in an image storage device as a single image. The storing processor stores the year, month, and day so that at least one of the year, month, and day can be differentiated.

The storing processor preferably stores one of the year, month, and day in a different color or a different character type in the image storage device. Further, the storing processor preferably stores the year, month, and day in the image storage device to enable at least the month and day in the year, month, and day to be differentiated. For example, the storing processor stores one of the month and day in the year, month, and day in a different color or different character type in the image storage device.

The date to be displayed on the screen preferably can be displayed in at least one display order of the year, month, and day; month, day, and year; and day, month, and year. The display order preferably can be changed on the screen by a switching operation of the display order.

The image stored in the image storage device preferably is at least reproduced and displayed on the screen or output as hard copy.

The storing processor preferably includes a character code output processor that outputs a character code corresponding to the date, and a character signal generating processor that generates a character signal in accordance with the character code output by the character code output processor, the character signal being output, along with a video signal corresponding to the object image, to the image storage device, so that the date is stored in the image storage device along with the image. In this case, preferably, the storing processor outputs the character code in such a manner that one of the year, month, and day, which should be differentiated from the others, is displayed in a mode of display which is different from that of the others.

BRIEF DESCRIPTION OF THE DRAWINGS

The present invention will be better understood from the description of the preferred embodiments of the invention set forth below, together with the accompanying drawings, in which:

FIG. 7 is a view of a character code table;

FIG. 19 is a view of a screen on which a date is displayed in the fourth embodiment;

FIG. 21 is a view of a character code table;

DESCRIPTION OF THE PREFERRED EMBODIMENTS

First to sixth embodiments of the present invention will be described below with reference to the drawings.

Figure 1:
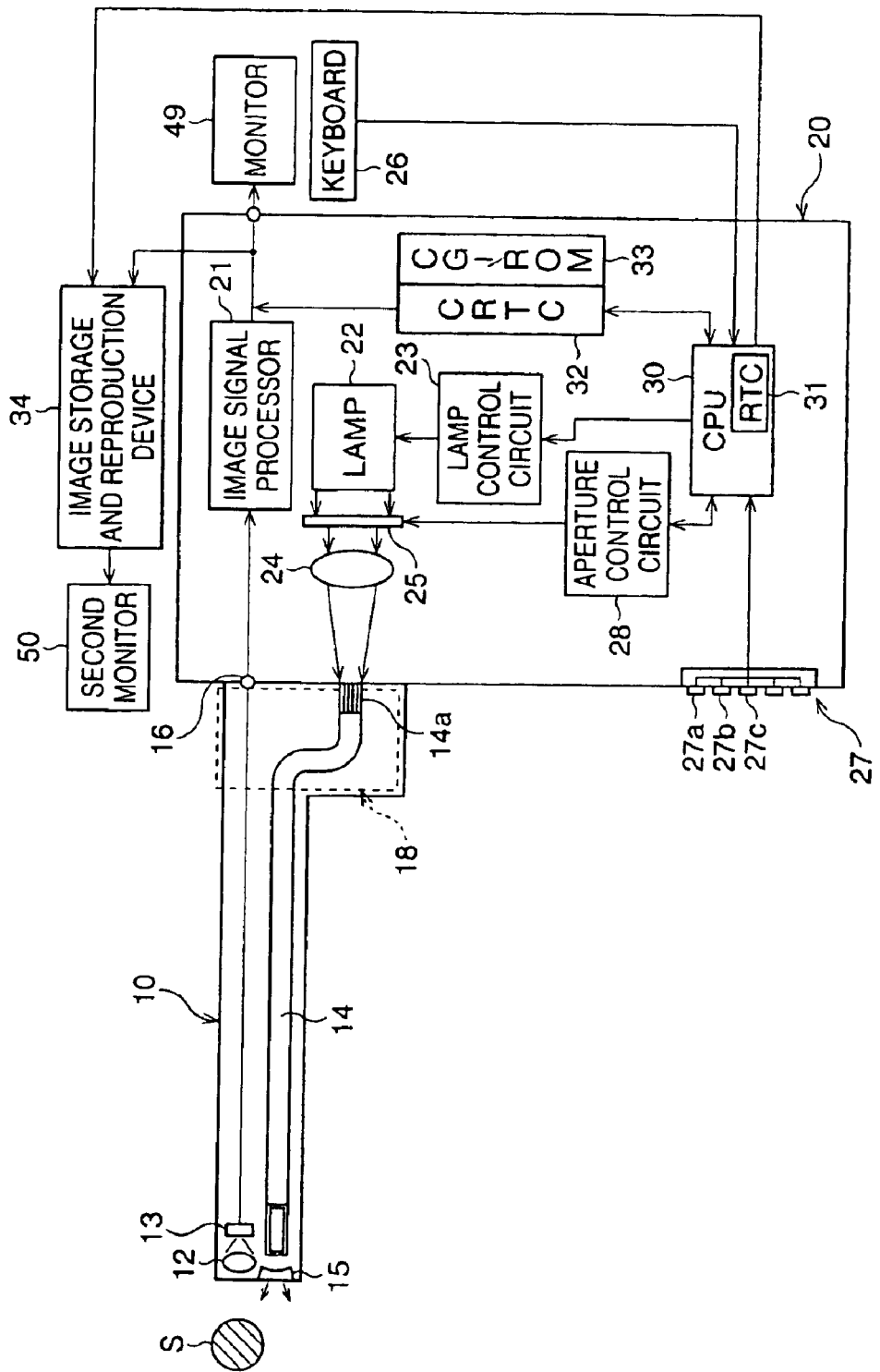
FIG. 1 is a block diagram of an electrical circuit of an electronic endoscope according to the first to sixth embodiments.

FIG. 1 is a block diagram of an electrical circuit of an electronic endoscope according to a first embodiment.

An electronic endoscope has a video-scope 10 and a video-processor 20. A distal end of the video-scope 10 is inserted into the stomach or other body cavity S while a proximal end of the video-scope 10 is connected through a connection part 18 to the video-processor 20. A monitor 49 is connected to the video-processor so that the image of the body cavity S is displayed on the monitor 49. Note that, in this embodiment, the NTSC color system is adopted as a video standard, but other video standard may be used in alternative embodiments.

Inside the video-scope 10 is provided a light guide 14 through which light is passed from a lamp 22 serving as a light source. The light guided from the lamp 22 strikes an incidence end 14a of the light guide 14 due to a condenser lens 24 converging the light. The light passing through the light guide 14 passes through a diffusion lens 15 which expands the distribution angle of the light and irradiates the body cavity S. The amount of light irradiated in the body cavity S at that time is adjusted by an aperture 25 provided between the lamp 22 and the condenser lens 24. The aperture 25 is opened and closed based on a signal sent from an aperture control circuit 28 so as to increase or decrease the amount of light.

The light irradiated in the body cavity S is reflected, so that the image of the body cavity S is formed on an imaging device 13 through the lens 12. On photo-diodes (not shown) arranged on a light receiving surface of the imaging device 13, red (R), green (G) and blue (B) color filter elements are disposed in a matrix arrangement, so that R, C and B image signals of the body cavity S are generated in the imaging device 13. The image signal corresponding to each of the colors is read from the imaging device 13 and transmitted through a connector 16 to the video-processor 20. Note that, since the NTSC color system is adopted, the image signal of the body cavity S is read at every 1/30 second.

The image signal of the body cavity S transmitted from the video-scope 10 is sent to an image signal processor 21. At the image signal processor 21, the image signal is separated into signals corresponding to the R, G, and B colors. The separated R, G and B image signals are converted into a video signal (i.e., NTSC signal) including a luminance signal and color differential signals, and are then output to the monitor 49.

A character signal transmitted from a cathode ray tube controller (CRTC) 32 is added to the video signal, output from the image signal processor 21, at a predetermined timing. The character signal relates to character information, such as a date displayed on the monitor 49. On the screen of the monitor 49, the character information is displayed at a predetermined position along with the image of the body cavity S. The video signal of the body cavity S, along with the character signal, are output to the monitor 49 at every 1/30 second, so that a moving image of the body cavity S is displayed in real time. Note that, in the processor 10, a timing generator (not shown) is provided, which adjusts a processing timing at which the image signals of the body cavity S are processed from the imaging device 13 to the monitor 49, Similarly, timing at which the character signal is added to the video signal output from the image signal processor 21, is adjusted by the timing generator.

In a central processing unit (CPU) 30, information relating to the current date and time is read from a real time clock RTC 31. Then, character codes, corresponding to character information to be displayed, are transmitted to the CRTC 32. At this time, information relating to the positions, at which the character information is displayed on the screen of the monitor 49, is transmitted to the CRTC 32 as data. A character generator read only memory (CG-ROM) 33 generating character signals is provided to the CRTC 32, and thus the character signals are read therefrom in accordance with the character codes, which are input to the CRTC 32. The read character signals are output from the CRTC 32 at a predetermined timing. Note that, in the character code output to the CRTC 32, information relating to colors of the characters are included.

Panel switches 27 and a keyboard 26 are connected to the CPU 30, and thus signals generated by operating the panel switches 27 and the keyboard 26 are input to the CPU 30.

The panel switches 27 are provided with an up switch 27a, down switch 27b, copy switch 27c, etc. The up switch 27a and the down switch 27b may be operated to adjust the brightness of the image displayed on the monitor 49. Further, the copy switch 27c may be operated to cause the image storage and reproduction device 34 to fetch the video signal and character signal when a pulse signal is sent to the image storage and reproduction device 34. By this, the screen on which the date and other character information and the body cavity S are displayed is stored as a still image in an electronic file, such as a magneto-optic disc, provided in the image storage and reproduction device 34. The image storage and reproduction device 34 has a second monitor 50 connected to it. The reproduced image may be displayed on the second monitor 50 according to need.

A lamp control circuit 23 receives as input a signal for turning on a lamp 22. The lamp 22 is lit up by this.

Figure 2:
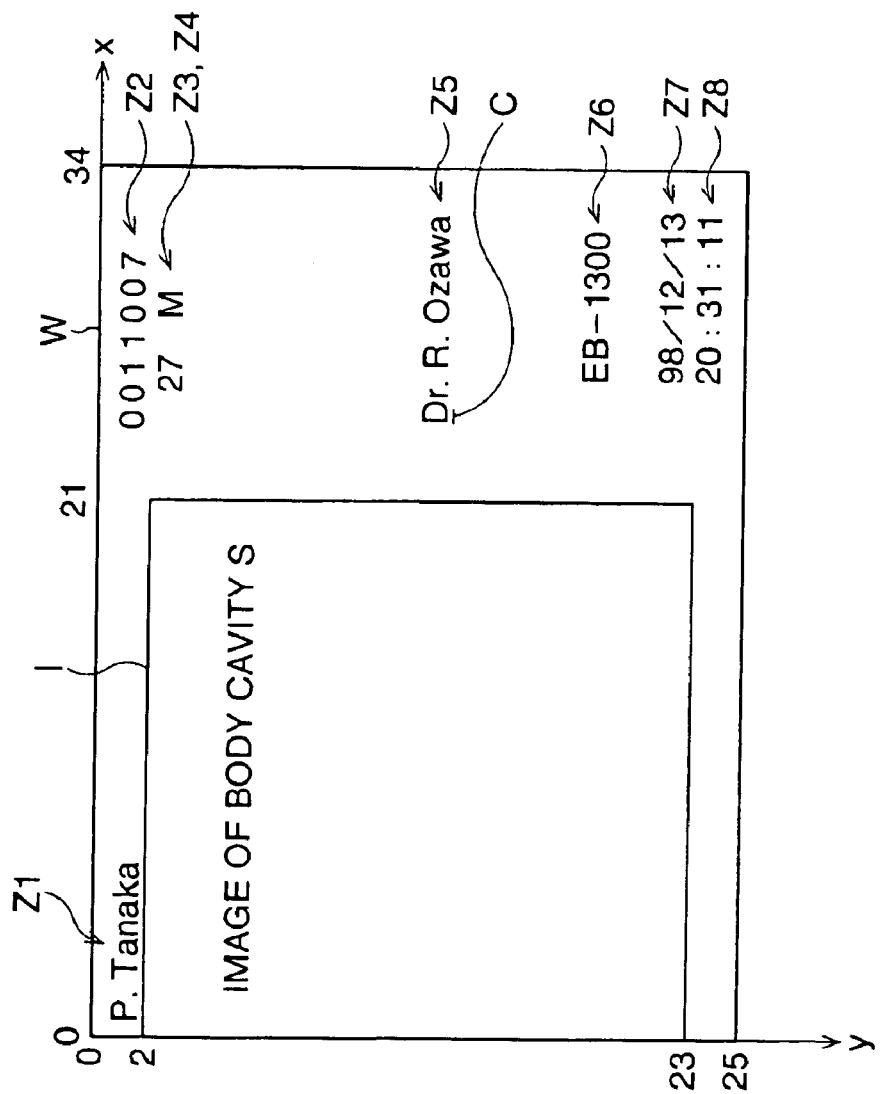
FIG. 2 is a view of a screen of a monitor.

FIG. 2 is a view of a screen displayed on the monitor 49.

On the screen W, the image of the body cavity S is displayed in an image region I. Further, character information on the name of a patient Z1 examined, an ID number Z2 of the patient, his or her age Z3, gender Z4, name of the physician Z5 conducting the examination, name Z6 of the video-scope 10 connected, current date Z7, and time Z8 is displayed on the screen along with the image of the body cavity S. Further, when newly updating the character information, the characters at the position of the cursor C are updated.

Note that the date is displayed by numerals in the order of the year, month, and day, 90 the date of examination becomes Dec. 13, 1998 on the screen W. Further, the coordinates (x,y) are set using the top left corner of the screen W as the origin.

Figure 3A:
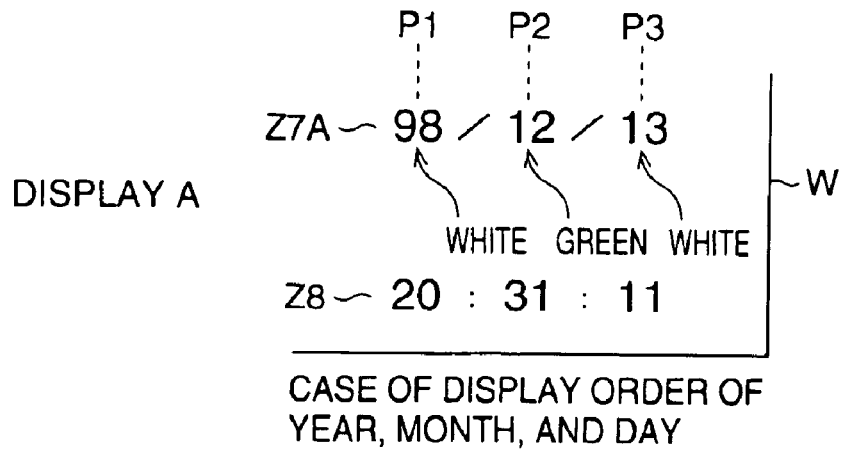
FIGS. 3A, 3B and 3C are views of screens on which dates are displayed in different orders of display.
Figure 3B:
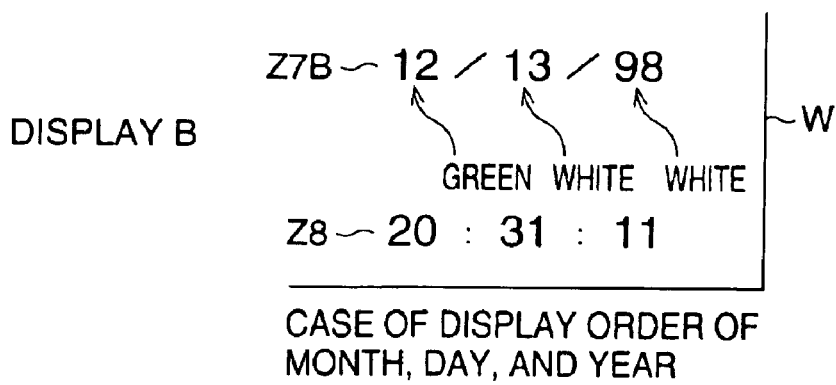
Figure 3C:
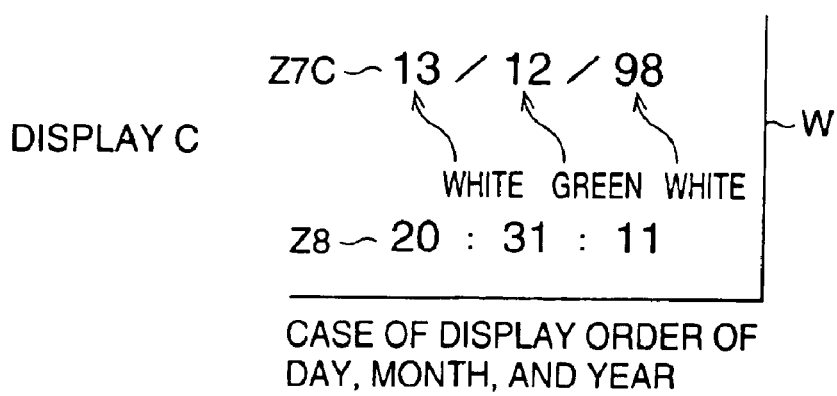

FIGS. 3A, 3B and 3C are partially enlarged views of screens on which dates Z7 are displayed in different orders of the year, month, and day.

In the display A, shown in FIG. 3A, the date Z7A using the order of display mainly used in Japan is displayed. The "year" is displayed at the position of P1, the "month" at the position of P2, and the "day" at the position of P3. The year and day are displayed white and the month is displayed green to facilitate differentiation of the month and day.

In the display B, shown in FIG. 3B, the date using the order of display mainly used in the U.S. is displayed. The date Z7B is displayed in the order of the month, day, and year. Further, in the display C, shown in FIG. 3C, the date Z7C using the order of display mainly used in Europe is displayed. The date is displayed on the screen W in the order of the day, month, and year.

The order of the date may be changed by pressing f5 (function key) on the keyboard 26. At this time, since the "day" and "month" are displayed in different colors, the date will never be misread even if the order is changed.

Figure 4:
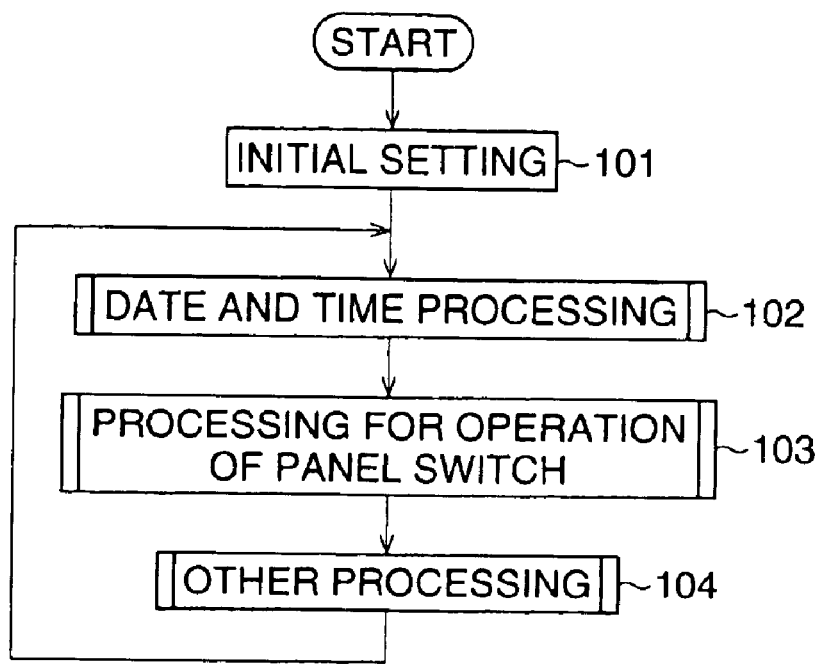
FIG. 4 is a flow chart of the operation of the electronic endoscope as a whole.

FIG. 4 is a flow chart showing the overall flow in the operation of the electronic endoscope as a whole. At step 101, by turning the power source on, the aperture 25 and various control use variables are set to their initial values.

At step 102, the current date and time are read from the RTC 31 of the CPU 30, and the date Z7 and time Z8 are displayed on the monitor 49.

At step 103, processing is executed for the operation of the panel switches 27. For example, by operating the copy switch 27c, the image of the body cavity S is stored in the image storage device 34.

At step 104, for example, the processing for the time when the video-scope 10 is newly connected is executed.

The operation of the electronic endoscope is repeated until the power source is turned off. Subroutines are executed at step 102 to step 104.

Figure 5:
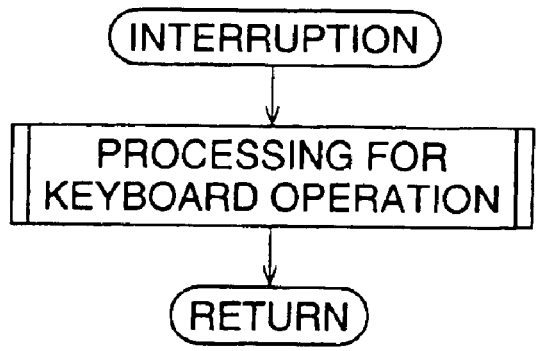
FIG. 5 is an interruption routine relating to the processing for the keyboard operation.

FIG. 5 is an interruption routine for the keyboard operation. This interruption routine is executed by operation of the keyboard 26 during the processing of step 102 to step 104.

The processing of the interruption routine will be explained later with reference to FIG. 10.

Below, an explanation will be made of the subroutine of step 102 and the interruption routine of FIG. 5 using FIG. 6 to FIG. 11.

Figure 6:
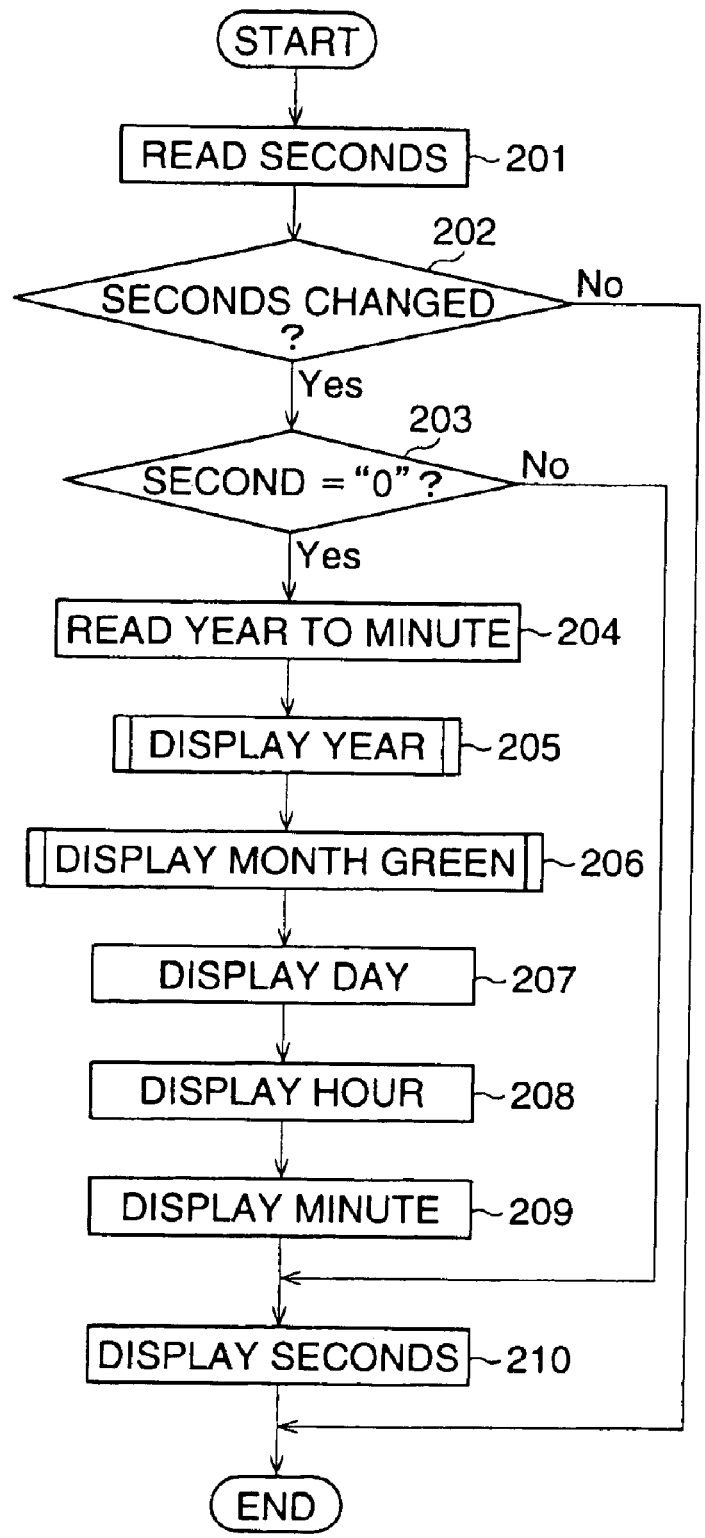
FIG. 6 is a flow chart of a subroutine of step 102 in FIG. 4.

FIG. 6 is a flow chart of the subroutine of step 102. An explanation will be made of the processing for display of the date and time using FIG. 6.

At step 201, the "seconds" are read from the RTC 31. At step 202, it is judged if the "seconds" read at step 201 have changed from the seconds read the previous time. When it is judged that the "seconds" have changed, the routine proceeds to step 203. When it is judged that the "seconds" have not changed, the routine of steps 202 to 210 is not executed and the subroutine ends.

At step 203, it is judged if the "seconds" read at step 201 are "0" or not. That is, it is judged if there has been a change in the date and time other than the seconds. When it is judged that the "seconds" are "0", the routine proceeds to step 204. When it is judged that the "seconds" are not "0", steps 204 to 209 are skipped and the routine proceeds to step 210.

At step 204, the date and the hour and minutes are read from the RTC 31. When the date and the hour and minutes are read, the routine proceeds to step 205.

FIG. 7 shows a character code table which defines character codes. The character code corresponding to the "month" is selected from the character code (B0H to B9H) at the range (B) and corresponds to the green color numerals 0 to 9 displayed on the screen W. The character codes for the year, day, hour, minute, and seconds are selected from the character codes (30H to 39H) in the range (A) and correspond to the white color numerals 0 to 9. For example, when the month is displayed as this corresponds to the character codes B1H and B2H.

At step 205, the "year" is displayed on the screen by white color numerals. At this time, the "year" is displayed at a predetermined position so as to correspond to one of the orders of display shown in FIGS. 1A, 3B and 3C.

Figure 8:
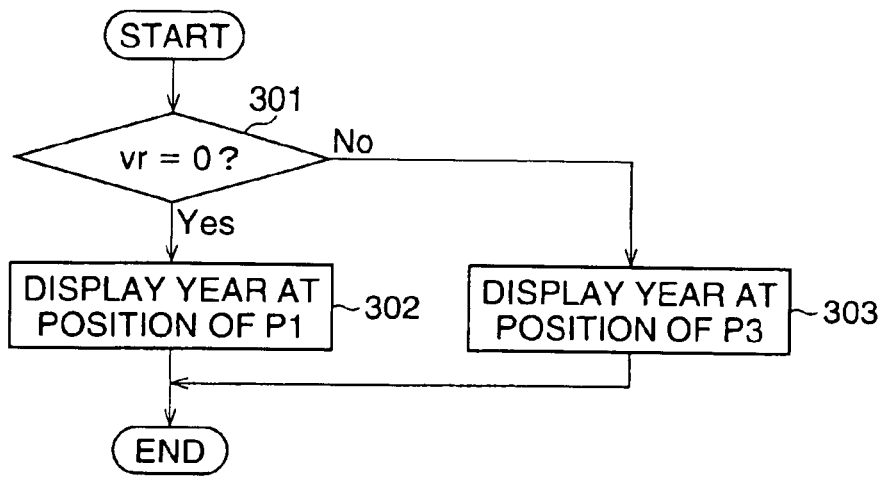
FIG. 8 is a flow chart of a subroutine of step 205 in FIG. 6.

FIG. 8 is a flow chart of a subroutine of step 205. At step 301, it is judged if the display order variable vr is "0". The display order variable is a variable for expressing the display order of the year, month, and day. When vr=0, the date is displayed in the order of the year, month, and day, when vr=1, in the order of the month, day, and year, and when vr=2, in the order of the day, month, and year.

When it is judged at step 301 that the display order variable vr is "0", the routine proceeds to step 302, where the "year" is displayed on the screen at the position of P1 as shown in FIG. 1A. That is, the coordinates of the position of P1 and the character codes of the "Year" (for example, if 1998, 39H and 38H) are given to the CRTC 32. When the "year" is displayed on the screen, the subroutine ends and the routine proceeds to step 206 of FIG. 6.

When it is judged at step 301 that the display order variable vr is not "0", the routine proceeds to step 303 where the "year" is displayed at the position of P3 as shown in FIG. 3C. When the "year" is displayed, the subroutine ends and the routine proceeds to step 206 of FIG. 7.

At step 206, the "month" is displayed on the screen W by green color numerals. At this time, the "month" is displayed at a predetermined position so as to correspond to an order of display shown in FIGS. 1A, 3B and 3C.

Figure 9:
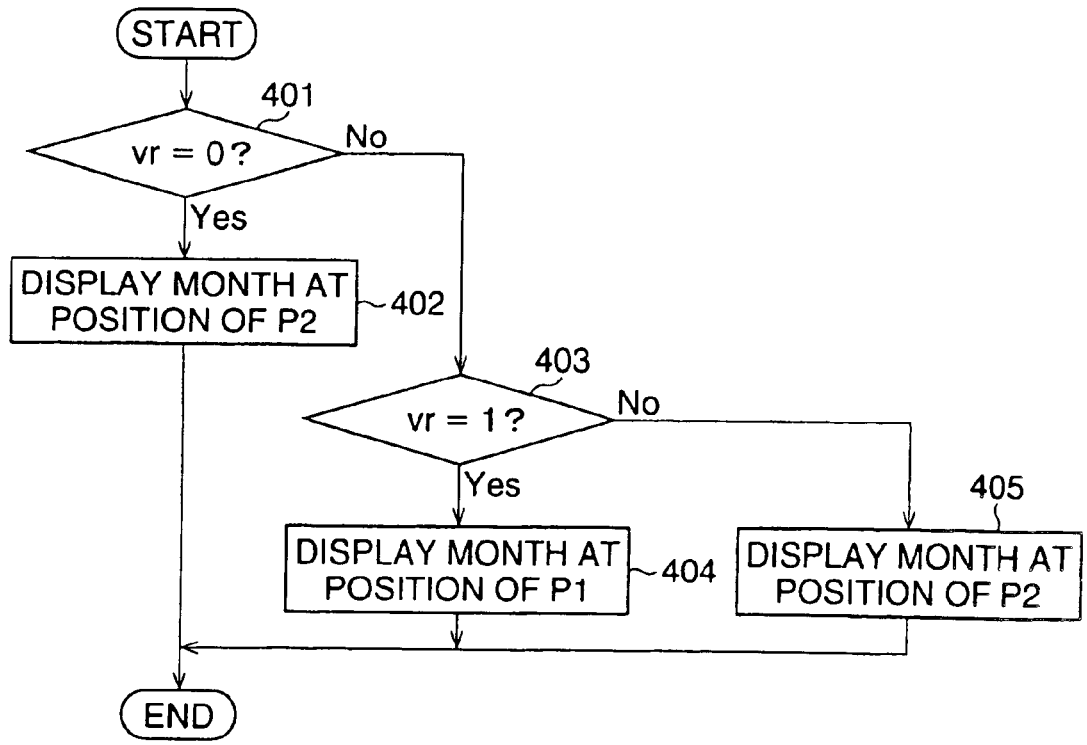
FIG. 9 is a flow chart of a subroutine of step 206 in FIG. 6.

FIG. 9 is a flow chart of a subroutine of step 206. At step 401, it is judged if the display order variable vr is "0", that is, if the date is displayed in the order of the year, month, and day.

When it is judged at step 401 that the display order variable vr is "0", the routine proceeds to step 402 where the "month" is displayed on the screen W at the position of P2 as shown in FIG. 3A in green color numerals. That is, the coordinates of the position of P2 and the character codes of the month (for example, if December, B1H, B2H) are given to the CRTC 32. If the "month" is displayed on the screen W, the subroutine ends and the routine proceeds to step 207 of FIG. 6.

When it is judged at step 401 that the display order variable vr is not "0", the routine proceeds to step 403. At step 403, it is-judged if the display order variable vr is "1".

When it is judged at step 403 that the display order variable vr is "1", the routine proceeds to step 404, where the "month" is displayed on the screen W at the position of P1 as shown in FIG. 3B in green color numerals. When the "month" is displayed on the screen W, the subroutine ends and the routine proceeds to step 207 of FIG. 6. When it is judged at step 403 that the display order variable vr is not "1", the routine proceeds to step 405, where the "month" is displayed on the screen W at the position of P2 as shown in FIG. 3C by green color numerals. When the "month" is displayed on the screen W, the subroutine ends and the routine proceeds to step 207 of FIG. 6.

At step 207, the "day" is displayed on the screen W in white color numerals. At this time, in the same way as the "year" and "month" displayed at step 205 and step 206, branching is performed by the value of the display order variable vr, and the "day" is displayed at a predetermined position. When the "day" is displayed on the screen W, the routine proceeds to step 208. At steps 208 and 209, the "hour" and "minute" are displayed on the screen by numerals. When the "hour" and the "minute" are displayed at predetermined positions, the routine proceeds to step 210. At step 210, the "seconds" are displayed on the screen by numerals, When the "seconds" are displayed on the screen, the series of processing for display of the date and time ends.

Figure 10:
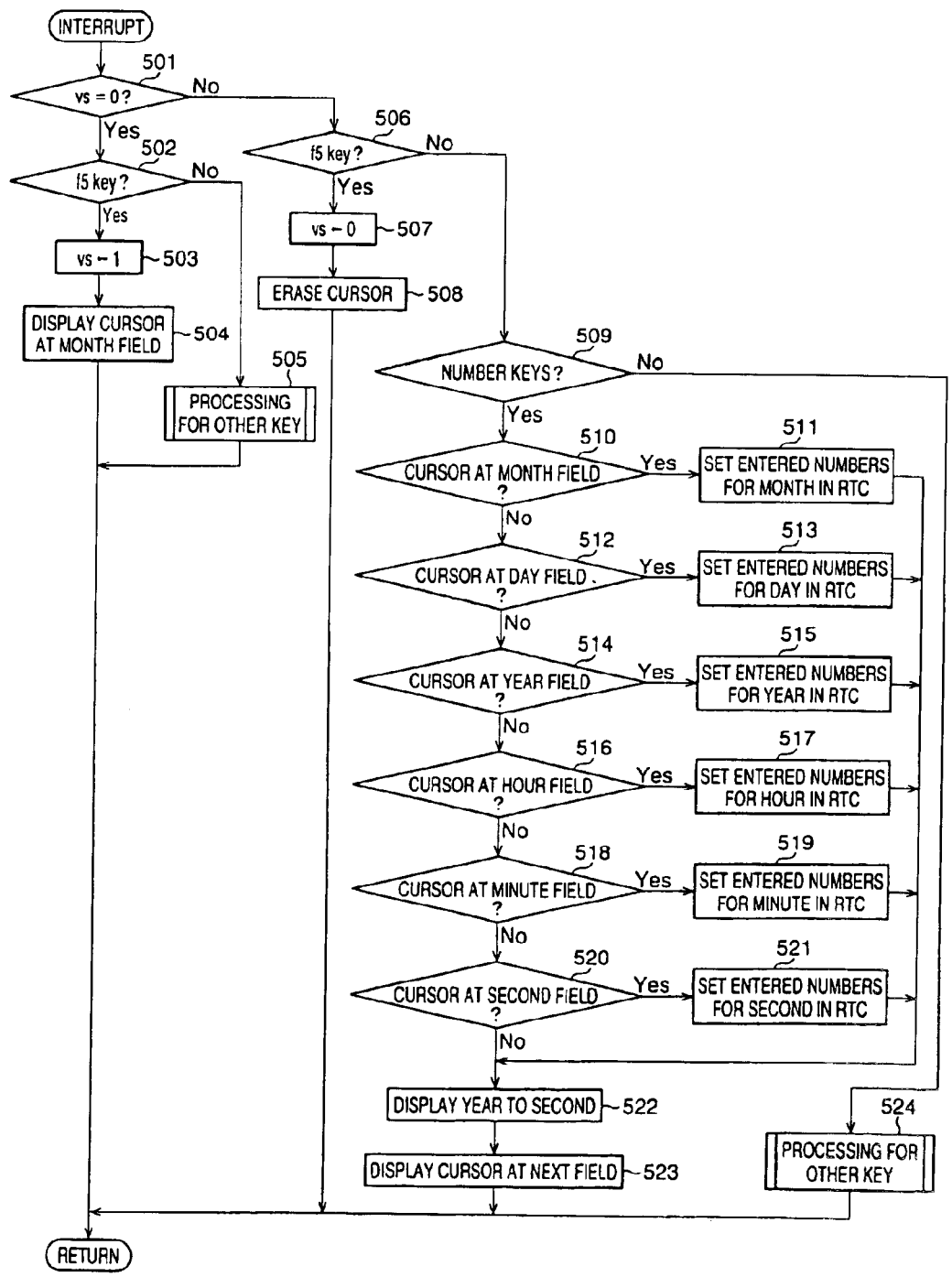
FIG. 10 is a flow chart of an interruption routine of FIG. 5.

FIG. 10 is a flow chart of an interruption routine of FIG. 5. An explanation will be given of the processing for the operation of the keyboard 26 using FIG. 10. This interruption routine is started by depression of any of the keys of the keyboard 26. In this interruption routine, in particular, the processing for the f5 key, f6 key, and 0 to 9 numeral keys is shown.

At step 501, it is judged if the date and time setting variable vs is "0". This date and time setting variable vs is a variable showing if the state, in which the date and time can be entered by the operator operating the keyboard 26, has been set. When in the state for setting these, the date and time setting variable vs is "1", while not in the state for setting these, the date and time setting variable vs is "0".

When it is judged at step 501 that the date and time setting variable vs is "0", namely that the state for setting the date and time has not been set before operation of the keyboard 26, the routine proceeds to step 502. At step 502, it is judged if the f5 key was depressed among the function keys on the keyboard 26. This f5 key is the on/off key for the operation for setting the date.

When it is judged at step 502 that the fS key has been depressed and the state for setting the date and time has been changed, the routine proceeds to step 503, where the date and time setting variable vs is made "1". At step 504, the cursor. C (see FIG. 2) is displayed at the position of the "month" in the date and time. Here, however, the date is made one displayed on the screen W in the order of the month, day, and year (see display B of FIG. 3B). When the cursor C is displayed at the position of the "month", the interruption routine ends.

When it is judged at step 502 that the fS key has not been depressed, the routine proceeds to step 505. At step 505, the processing for depression of another key, for example, the f6 key, is executed.

Figure 11:
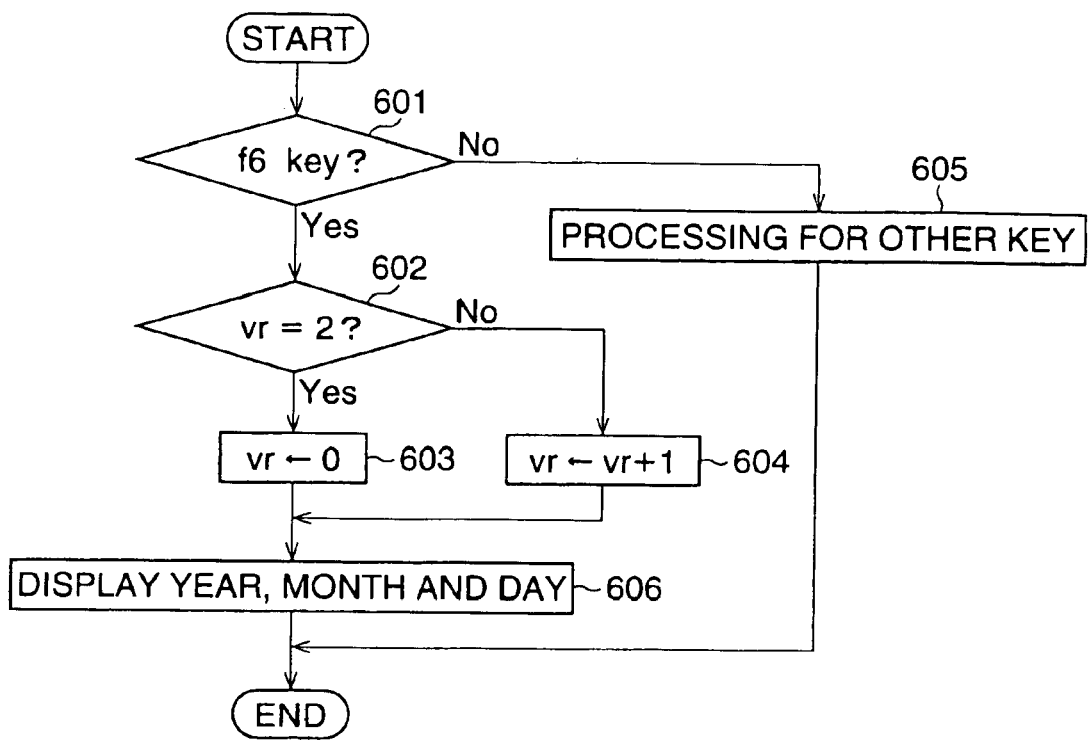
FIG. 11 is a flow chart of a subroutine of step 505 in FIG. 10.

FIG. 11 is a flow chart of a subroutine of step 505.

At step 601, it is judged if the f6 key of the function keys on the keyboard 26 has been depressed or not. The f6 key is a key for changing the order of arrangement of the date. When the display order variable vr is "0", the date is displayed in the order of the year, month, and day, when the display order variable vr is "1", in the order of the month, day, and year, and when the display order variable vr is "2", in the order of the day, month, and year.

When it is judged at step 601 that the f6 key has been depressed, the routine proceeds to step 602. At step 602, it is judged if the display order variable vr is "2", that is, if the date is displayed in the order of the day, month, and year before the depression of the f6 key.

When it is judged at step 602 that the display order variable vr is "2", the routine proceeds to step 603, where the display order variable vr is set to "0". Then, step 606 is executed where the date is displayed on the screen W in the order of the year, month, and day (see the display A of FIG. 3A). Note that the processing of step 606 is identical with that of each of steps 205 to 207 shown in FIG. 6. When the date is displayed on the screen w in the order of the year, month, and day, the subroutine ends.

When it is judged at step 602 that the display order variable vr is not "2", the routine proceeds to step 604, where "1" is added to the display order variable vr. At step 606 is then executed so that the date is displayed on the screen W in the order of the month, day, and year, or in the order of the day, month, and year (see the display B of FIG. 3B or the display C of FIG. 3C). When the date is displayed on the screen w in the order of the month, day, and year, or in the order of the day, month, and year, the subroutine ends.

When it is judged at step 601 that the f6 key has not been depressed, the routine proceeds to step 605. At step 605, the processing for another key, for example, the execution key, is executed. Further, when the processing for the other key is executed, the subroutine ends.

When the processing for the other key is executed at step 505, the interruption routine ends.

When it is judged at step 501 that the date and time setting variable vs is not "0", namely that the state for setting the date has been set before the operation of the keyboard, the routine proceeds to step 506.

At step 506, it is judged if the f5 key has been depressed. That is, it is judged if the setting state has been (switched to the normal display state. When it is judged at step 506 that the f5 key has been depressed, the routine proceeds to step 507, where the date and time setting variable vs is made "0". Further, at step 508, the cursor C is erased from the screen W. When the cursor C is erased, the interruption routine ends. When it is judged at step 506 that the f5 key has not been depressed, the routine proceeds to step 509.

At step 509, it is judged if the 0 to 9 number keys have been depressed on the keyboard 26. These numeral keys are depressed when the operator inserts the numerals for the date and time.

When it is judged at step 509 that the number keys have been depressed, the routine proceeds to step 510. At step 510, it is judged if the cursor C has been displayed at the position of the "month". When it is judged that the cursor C is displayed at the position of the "month", the routine proceeds to step 511, where the entered number is set for the "month" of the RTC 31. When the "month" has been newly set in the RTC 31, the routine proceeds to step 522.

At steps 512 to 521, the processing executed at steps 510 and 511 is executed for the year, day, hour, minute, and seconds as well. That is, at steps 512, 514, 516, 518, and 520, it is successively judged if the cursor C is displayed at the positions 10 of the "day", "year", "hour", "minute", and "seconds". Further, at steps 513, 515, 517, 519, and 521, the entered numbers are successively set in the "year", "day", "hour", "minute", and "seconds" of the RTC 31 and the routine proceeds to step 522.

At step 522, date and time are displayed on the screen W by numerals based on the date and time newly set in the RTC 31 by the execution of steps 510 to 521. Further, at step 523, the cursor C is moved to the next right position or the next field. For example, the cursor C at the position of the month is moved to the position of the day. When the cursor C is moved, the interruption routine ends.

At step 524, the processing for another key is executed. When the processing for the other key is executed, the interruption routine ends.

In this way, according to the first embodiment, by the execution of step 204 to step 207, the "month" is displayed on the screen W by green color numerals and the "year" and "day" by white color numerals. Due to this differentiation, it is easy for one viewing the display to distinguish between the month and the day and there is no chance of the date being misread even when reproducing and displaying the stored image of the body cavity S.

It is possible to switch the colors of the "month" and "day" and display the "day" on the screen W in a green color. Further, the colors of the year, month, and day displayed on the screen W are not limited to white and green. It is possible to use any two different colors.

Instead of the image storage and reproduction device 34, it is possible to provide an image storage device equipped with a hard copy function enabling printing of the image of the body cavity S. Further, the monitor 49 is not limited to a CRT and may be a liquid crystal display as well.

Next, an explanation will be made of a second embodiment. Since the electrical circuit and the processing for operation of the keyboard 26 in the second embodiment are the same as in the first embodiment, the explanation of the block diagram and the processing for the keyboard operation will be omitted.

Figure 12:
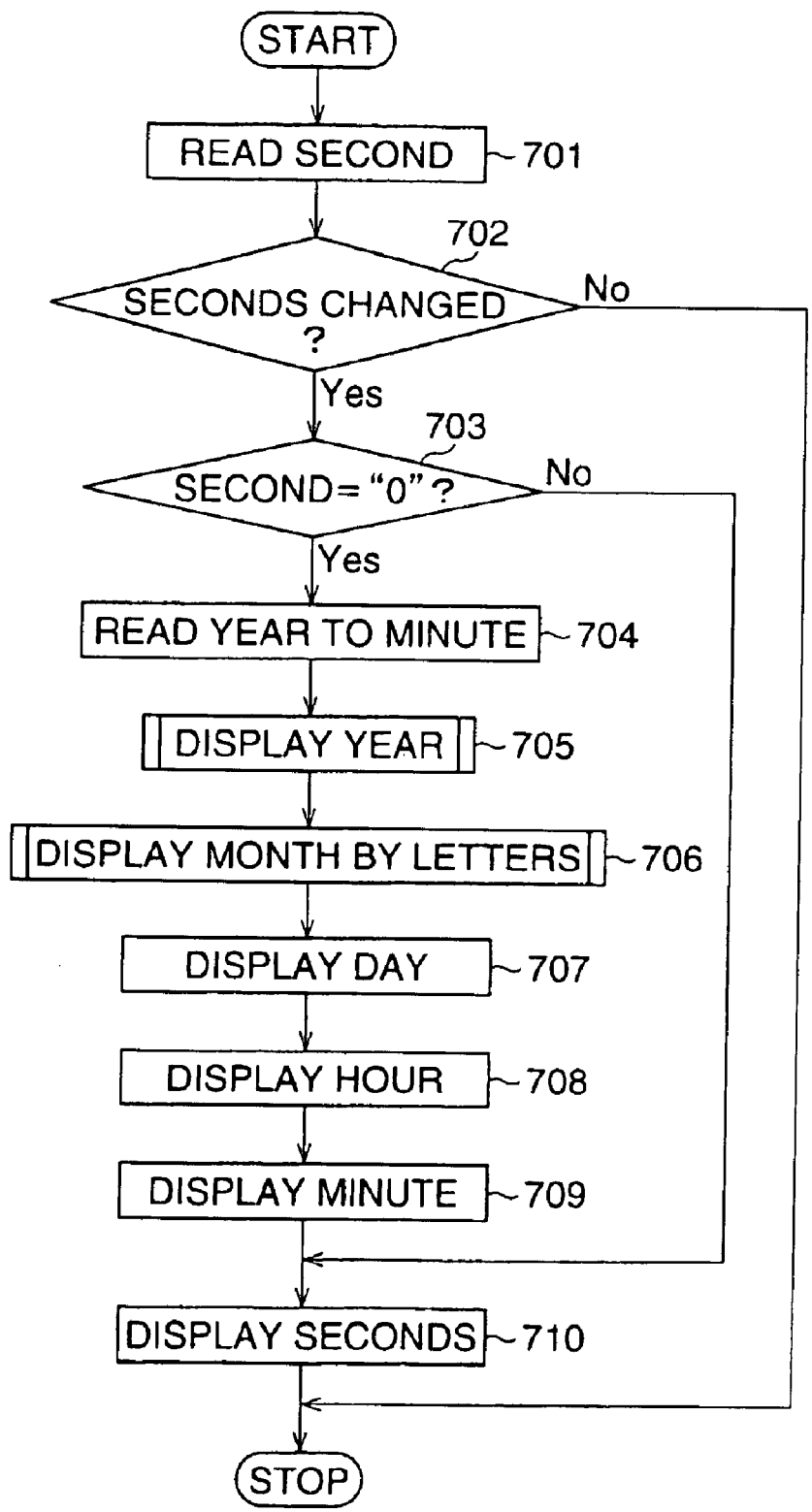
FIG. 12 is a flow chart showing processing for display of the date and time in a second embodiment.

FIG. 12 is a flow chart showing processing for display of the date and time in the second embodiment. The second embodiment differs from the first embodiment in that the "year" and "day" are displayed by numerals and the "month" is displayed by letters.

In FIG. 12, steps 701 to 710, except for step 706, are executed in the same way as the execution of steps 201 to 210 (except for step 206).

At step 704, information on the year, month, day, hour, and minute displayed on the screen W is read from the RTC 31.

Figures 13, 14:
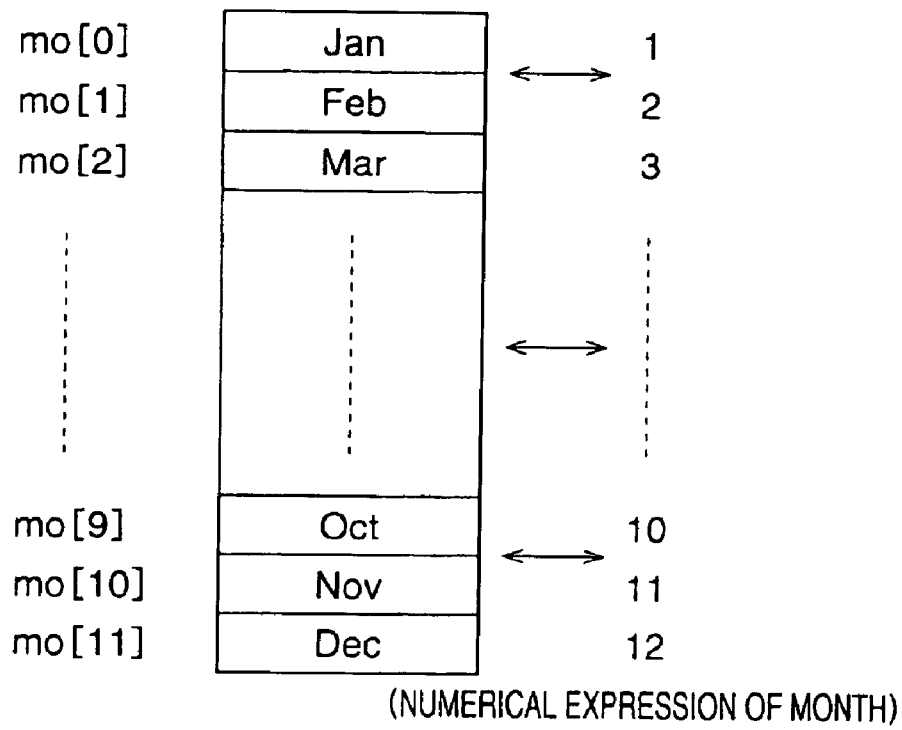
FIG. 13 is a view of a matrix in which the month shown by letters is stored.
FIG. 14 is a view of a screen on which a date in which the month is indicated by letters is displayed.

FIG. 13 shows the first three letters of the "month"0 stored in the matrix $m_0$"0 to 11". Note that the letters here spell out the "month" in the English language. By using this matrix $m_0$"0 to 11", the character codes corresponding to the three letters in the matrix $m_0$ are given to the CRTC 32.

At step 706, the "month" is displayed on the screen W by the first three letters. Here, however, the date Z7D is displayed on the screen in the order of the month, day, and year (see FIG. 14).

In this way, according to the second embodiment, by executing steps 704 to 707, the "year" and "day" are displayed by numerals and the "month" is displayed by letters. Due to this, the month and day can be easily differentiated and there is no chance of misreading the date.

Next, an explanation will be made of a third embodiment. In the third embodiment, the day and month are differentiated from each other only while in the state for setting the date and time, that is, when the date and time setting variable vs is "1". In a normal state, the year, month, and day are all displayed on the screen W by the same white color numerals. Note that, since the electrical circuit and the processing for operation of the keyboard 26 in the third embodiment are the same as in the first embodiment, the explanation of the block diagram and the processing for the keyboard operation will be omitted.

Figure 15:
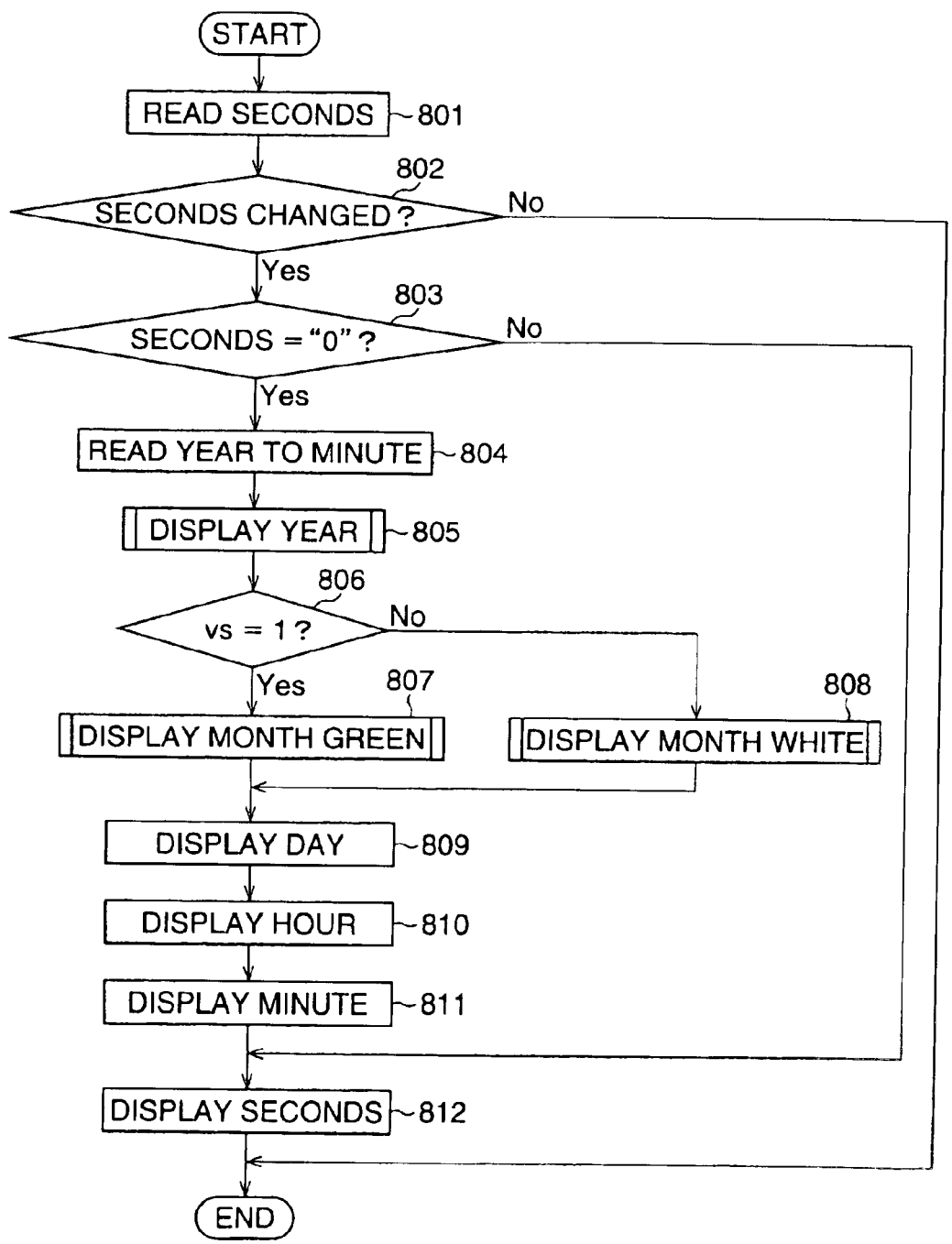
FIG. 15 is a flow chart of the processing for display of the date and time in the third embodiment.

FIG. 15 is a flow chart of the processing for display of the date and time in the third embodiment.

Steps 801 to 805 are executed in the same way as the execution of steps 201 to 205 of the flow chart of FIG. 6 of the first embodiment.

Figure 16:
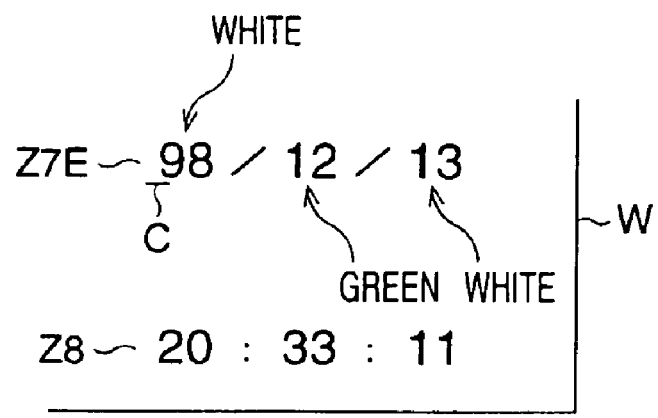
FIG. 16 is a view of a screen in an initialization state.

At step 806, it is judged if the date and time setting variable vs is "1", that is, if it is in the state for setting the date. When it is judged that the date and time setting variable vs is "1", the routine proceeds to step 807. At step 807, the "month" is displayed at a predetermined position by green color numerals (see the date Z7E of FIG. 16). When the "month" is displayed at a predetermined position, the routine proceeds to step 809.

Figure 17:
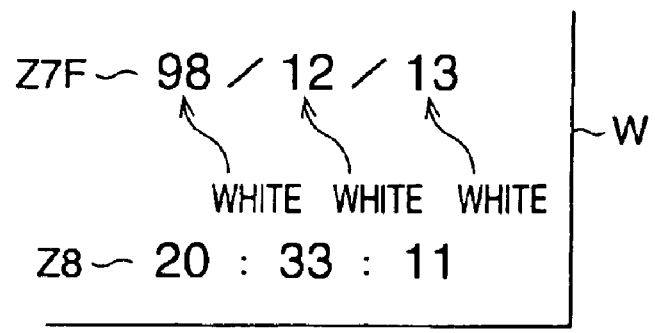
FIG. 17 is a view of a screen in an ordinary state.

When it is judged at step 806 that the date and time setting variable vs is "0", that is, it is not in the setting state, the routine proceeds to step 808. At step 808, the "month" is displayed at a predetermined position by white color numerals (see the date 27F in FIG. 17). When the "month" is displayed at a predetermined position, the routine proceeds to step 809.

Steps 809 to 812 are executed in the same way as the execution of steps 207 to 210 of FIG. 6. When the processing at step 812 is executed, the processing for display of the date and time at the third embodiment ends.

In this way, according to the third embodiment, by the execution of steps 806 to 808, only the "month" is displayed by green color numerals while the date and time are being set. Due to this, there is no chance of mistakenly setting the "day" when intending to set the "month". Further, it is possible to easily discern if the apparatus is currently in the state for setting the date and time.

The colors of the "month" and "day" may be changed and the "day" displayed on the screen W in the green color as well. Further, the colors of the year, month, and day displayed on the screen W are not limited to white and green. Any two different colors may be used.

Next, an explanation will be given of a fourth embodiment. In the fourth embodiment, the "month" is displayed on the screen w in italics. Note that, since the electrical circuit and the processing for operation of the keyboard 26 in the fourth embodiment are the same as in the first embodiment, the explanation of the block diagram and the processing for the keyboard operation will be omitted.

Figure 18:
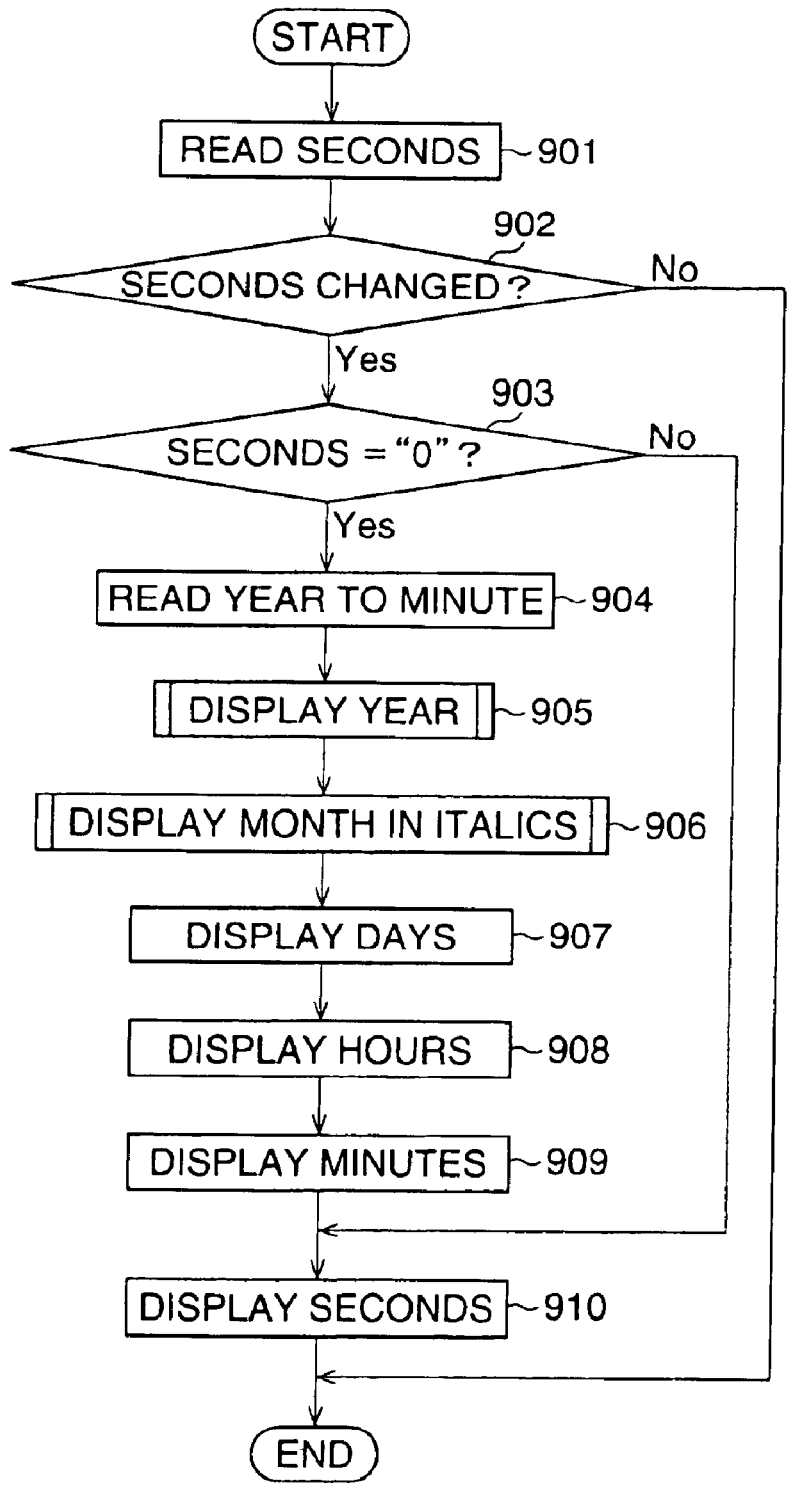
FIG. 18 is a flow chart of the processing for display of the date and time in a fourth embodiment.

FIG. 18 is a flow chart of the processing for display of the date and time. Steps 901 to 910, except for 906, are executed in the same way as the execution of steps 201 to 210 (except step 206) of FIG. 6.

Figure 19:
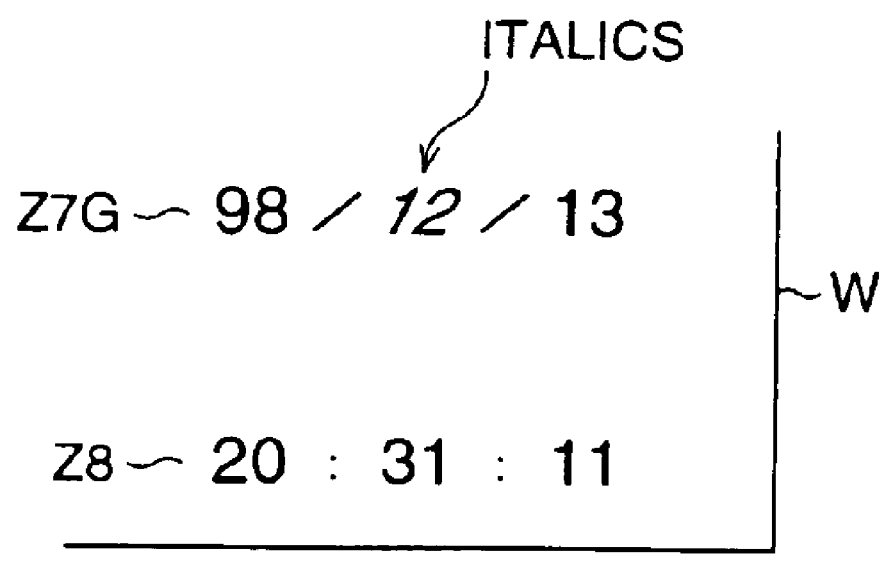

In step 906, the "month" is displayed at a predetermined position. At this time, the month is displayed in italics (see date Z7G of FIG. 19). That is, in the character code table T of FIG. 7, instead of 30H to 39H, F0H to F9Z (character codes of range (C)) are given to the CRTC 32.

In this way, according to the fourth embodiment, by the execution of steps 904 to 907, just the "month" is displayed on the screen W in italics. Due to this, the "month" and "day" can be easily differentiated and there is no longer a chance of misreading the date.

Note that instead of the "month", it is also possible to display the "day" on the screen W in italics.

Next, an explanation will be given of a fifth embodiment. In the fifth embodiment, the year, month, and day are displayed on the screen W by different colors.

Figure 20:
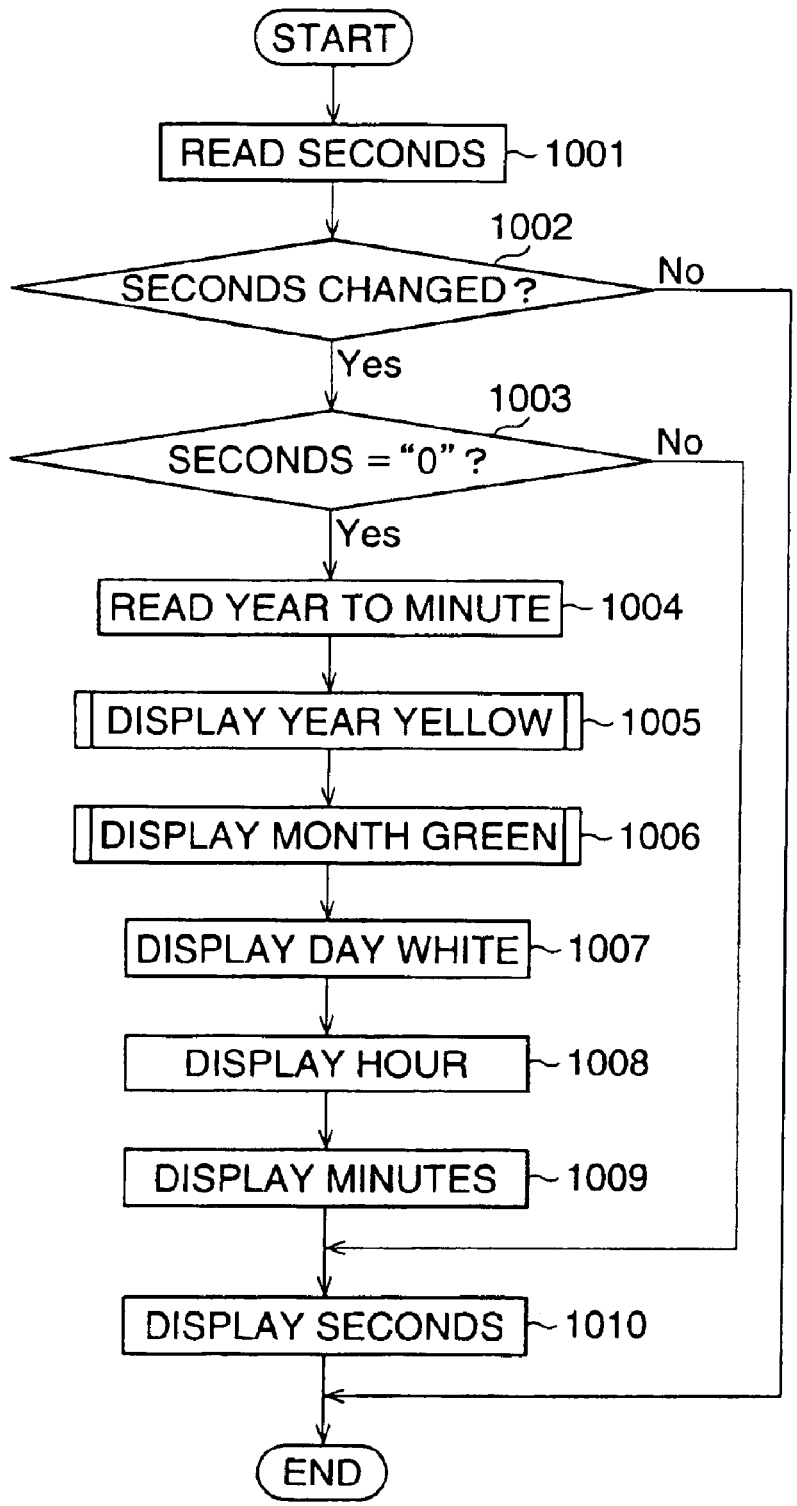
FIG. 20 is a flow chart of the processing for display of the date and time in a fifth embodiment.

FIG. 20 is a flow chart of the processing for display of the date and time in the fifth embodiment. Step 1001 to step 1004 are executed in the same way as execution of steps 201 to 204 of FIG. 1 of the first embodiment.

At steps 1005 to 1007, the "year", "month", and "day" are displayed at predetermined positions by different designated colors. In the fifth embodiment, the "year" is displayed by the yellow color, the "month" by the green color, and the "day" by the white color, so the character codes of the year, month, and day become the character codes of the range (B), range (C), and range (A) of the character code table T' shown in FIG. 21 in that order.

Figure 22:
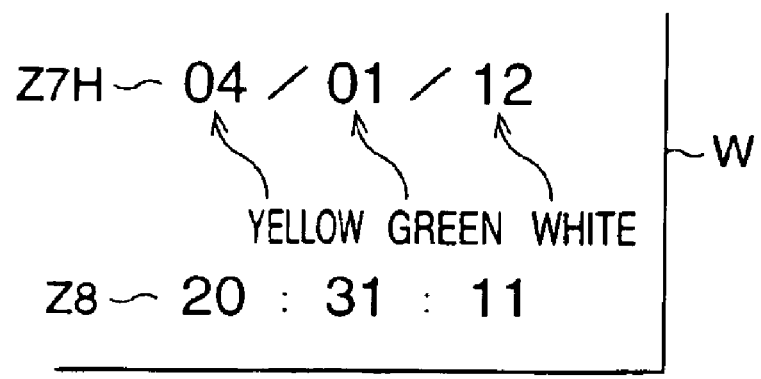
FIG. 22 is a view of a screen on which a date is displayed in the fifth embodiment.

FIG. 22 is a view of a screen W displaying January 12, 2004. The date Z7H is displayed in the order of the year, month, and day, however.

Step 1008 to step 1010 are executed in the same way as execution of steps 208 to 210 of FIG. 6 of the first embodiment. When step 1010 is executed, the processing for display of the date and time ends.

In the above way, according to the fifth embodiment, by the execution of steps 1004 to 1007, the date Z7H is displayed on the screen w by separate colors for the year, month, and day. Due to this, even when past the year 2000, the year, month, and day can be easily differentiated from each other and there is no chance of misreading the date. Further, for the display of the last two digits of the "year", by displaying the 1990s in white and the 2000s in yellow, it becomes easy to differentiate the 1990s from the 2000s.

Note that the colors of the year, month, and day are not limited to yellow, green, and white. Any three colors may be used.

Next, an explanation will be given of a sixth embodiment. In the sixth embodiment, the year, month, and day are displayed in the same color on the screen W, but different colors are given to the year, month, and day when storing the image of the body cavity S in the image storage device 34. Since the electrical circuit and the processing for operation of the keyboard 26 in the sixth embodiment are the same as in the first embodiment, the explanation of the block diagram and the processing for the keyboard operation will be omitted. Further, the processing for displaying the date and time is the same as that of the first embodiment except for the display of the year, month, and day on the screen W in all white colors.

Figure 23:
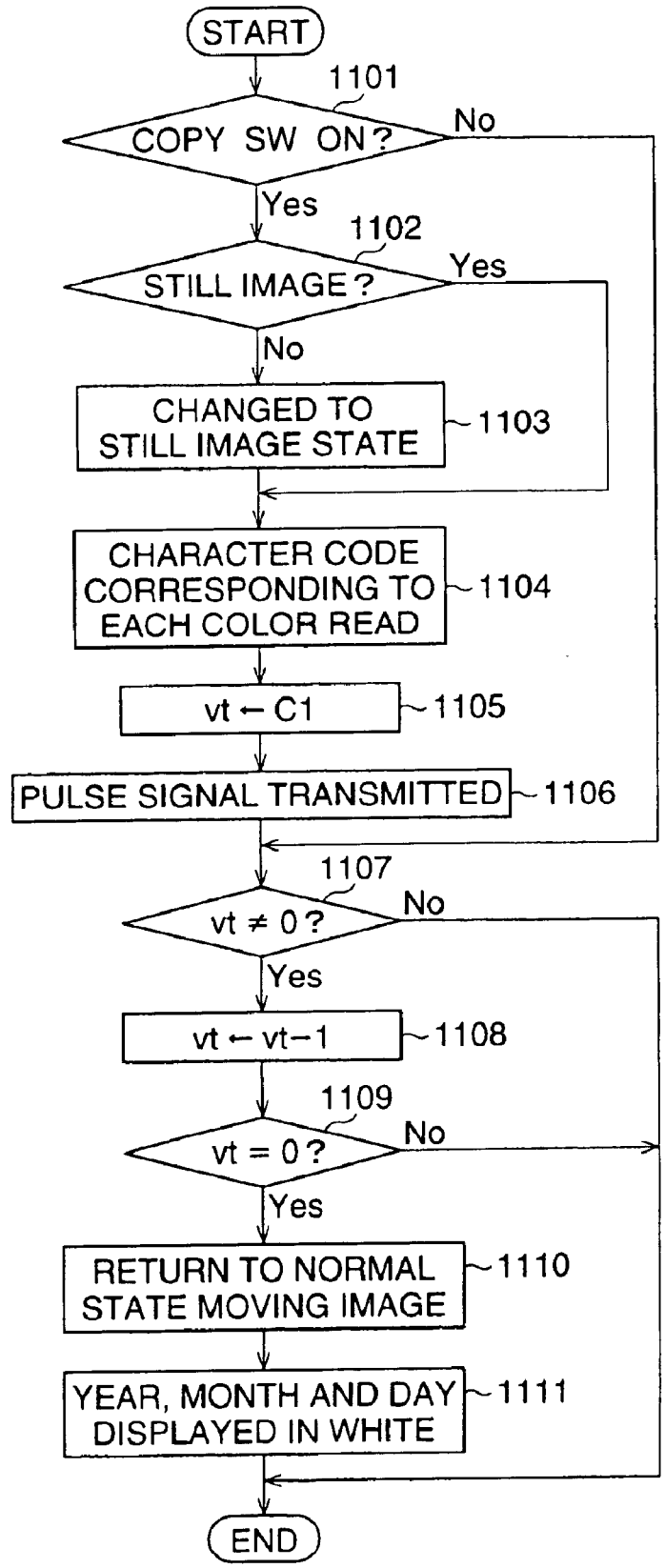
FIG. 23 is a flow chart of the processing for storing an image in a sixth embodiment.

FIG. 23 is a flow chart of the storage processing for storing a screen W, on which an image of a body cavity S is displayed along with the date etc., in the image storage device 34 as a stationary image and corresponds to the subroutine of step 103 of FIG. 4. The character code table T' of FIG. 21 is used for the character codes of the year, month, and day.

At step 1101, it is judged if the copy switch 27c is in the on position. When it is judged that the copy switch 27c is in the on position, the routine proceeds to step 1102. When it is judged that the copy switch 27c is not in the on position, steps 1102 to 1106 are not executed and the routine proceeds to step 1107.

At step 1102, it is judged if the screen on the monitor 49 is in the still image state. That is, it is judged if the screen W has been switched to the screen W for image storage. If it is judged that the screen W is not in a still image state, the routine proceeds to step 1103. At step 1103, the screen W is changed to a still image state and the routine proceeds to step 1104. When it is judged at step 1102 that the screen w is in a still image state, the routine proceeds to step 1104. Note that in the ordinary state, the year, month, and day are displayed on the screen W in all white colors.

At step 1104, the character codes corresponding to the year, month, and day are given to the CRTC 32 based on the character code table T'. Here, since the "year" is displayed in a yellow color, the "month" in a green color, and the "day" in a white color, the character codes in the range (B), the range (C), and the range (A) correspond to the character codes for the year, month, and day. At this time, the year, month, and day are displayed in predetermined colors on the screen W.

At step 1105, a predetermined time constant C1 is entered for the storage time variable vt. The stored time variable is a counter for counting the time when the screen W is in a still image state. The predetermined time variable C1 is the initial value of the stored time variable vt and shows the time interval until the screen W returns to the ordinary state. Here, the predetermined time variable C1 is made 1000. 1At step 1106, a pulse signal is transmitted to the image storage and reproduction device 34. Due to this, the video signal and the character signal are input to the image storage and reproduction device 34, so that an image of a body cavity S is stored along with the character information. At this time, the year, month, and day of different colors are stored. The routine then proceeds to step 1107.

At step 1107, it is judged if the stored time variable vt is not "0". When it is judged that the stored time variable vt is not "0", the routine proceeds to step 1108. When it is judged that the stored time variable vt is "0", steps 1108 to 1111 are not executed and the subroutine ends.

At step 1108, 1 is subtracted from the stored time variable vt. Further, at step 1109, it is judged if the stored time variable Vt is "0". That is, since a predetermined time variable C1 (=1000) is set for the stored time variable vt, the stored time variable vt is gradually subtracted from, and it is judged if one screen's worth of an image is stored in the image storage and reproduction device 34. When it is judged that the stored time variable vt is "0", the routine proceeds to step 1110. When it is judged that the stored time variable is not "0", steps 1110 to 1111 are not executed and the subroutine ends.

At step 1110, the screen W returns to the normal state moving image. Further, at step 1111, the year, month, and day are again displayed in white and the series of storage processing ends.

In this way, in the sixth embodiment, when storing the image of a body cavity S in the image storage device 34 by execution of step 1101 to 1111, character codes corresponding to the year, month, and day of different colors are used, and the year, month, and day, displayed in different colors on the image storage and reproduction device 34, are stored. Du e to this, when the image bf a body cavity S is reproduced and displayed in the second monitor 50, differentiation of the year, month, and day becomes easy and there is no chance of misreading the stored date.

Note hat instead of storing the year, month h, and day in different colors from each other, it is possible to d i splay one of the "month" and "day" in a different color or italics based on the character r cod e table T'. Further, the "month" may be displayed d by letters. Further, instead of the "month", it is also possible to display the "day" on the screen W in a different color or different font.

Further, instead of the image storage and reproduction device 34, it is possible to provide an image storage and reproduction device equipped with a hard copy function enabling printing of the image of a body cavity S.

In the first to sixth embodiments, the colors and the fonts of the date displayed are set based on the character code tables T and T' so as to facilitate at least determination of the month and day, but it is also possible to make just one of the year, month, and day a different color or font. For example, starting from 2000, if just the "year" is displayed on the screen W in a different color, the "year" can be determined from the displayed year, month, and day. When reproducing and displaying the stored image, it is possible to easily confirm the stored "year".

Summarizing the effect of the invention, in this way, according to the present invention, it is possible for one viewing the display to easily determined the year, month, and day from each other on a screen outputting and displaying the date along with the image of the body cavity.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-364892 (filed on Dec. 22, 1998) which is expressly incorporated herein, by reference, in its entirety.

What is claimed is:

1. A data generating device, provided in an electronic endoscope, said device generating an image data corresponding to an object image obtained by said electronic endoscope, and character information including a date when said object image is obtained, said device comprising:
   a date-differentiating processor that generates said character information so that, when said date is displayed on a screen of a display device along with said object image:
      at least one of the year, month, and day is differentiated on said screen, wherein said date-differentiating processor sets one of the year, month, and day to a color different from the others; and
      the date is displayed in an order of at least one of year, month and day; month, day and year; and day, month and year, wherein said display order can be changed on said screen by a switching operation of the display order.

2. The device according to claim 1, wherein said date-differentiating processor sets one of the year, month, and day to a color or character type different from the others only for the period of a date-setting operation.

3. The device according to claim 1, wherein said date-differentiating processor sets a mode of display of the year, month, and day so that said screen differentiates at least one of the month and day, of the displayed year, month, and day.

4. The device according to claim 3, wherein said date-differentiating processor sets one of the month and day, of the year, month, and day displayed by numerals, to a different color.

5. The device according to claim 3, wherein said date-differentiating processor sets one of the month and day, of the year, month, and day to be displayed by numerals, to a different color only for the period of the date setting operation.

6. The device according to claim 3, wherein said date-differentiating processor sets the year, month, and day to be displayed by numerals to respectively different colors.

7. The device according to claim 1, wherein said object image and date to be displayed on said screen are preferably stored as a single image in an image storage device.

8. The device according to claim 7, wherein said object image stored in said image storage device is at least reproduced and displayed on said screen or output as hard copy.

9. The device according to claim 1, further comprising a storing processor that stores ad date along with said object image, in an electronic fle.

10. The device according to claim 1, further comprising a display processor that displays said character information, generated by said date-differentiating processor, along with said object image, on said screen.

11. The device according to claim 10, wherein said display processor comprises a character code output processor that outputs a character code corresponding to said date, and a character signal generating processor that generates a character signal in accordance with said character code output by said character code output processor, said character signal being output, along with a video signal corresponding to said object image, to a monitor provided outside said electronic endoscope, so that said object image is displayed on said screen and said date is displayed at a predetermined position on said screen.

12. The device according to claim 11, wherein said date-differentiating processor outputs said character code in such a manner that one of the year, month, and day, to be differentiated from the others, is displayed in a mode of display which is different from that of the others.

13. An electronic endoscope comprising:
a display processor configured to display a date in an order of at least one of year, month and day; month, day and year; and day, month and year, along with an object image on a screen, wherein the display order can be changed on said screen by a switching operation of the display order; and
a storing processor that stores said date along with said object image in an image storage device as a single image;
said storing processor configured to differentiate at least one of the year, month, and day by storing one of the year, month, and day by the color different from a color of the other of the year, month, and day in said image storage device.

14. The electronic endoscope according to claim 13, wherein said storing processor stores the year, month, and day in said image storage device to enable at least the month and day in the year, month, and day to be differentiated on said screen.

15. The electronic endoscope according to claim 14, wherein said storing processor stores one of the month and day in the year, month, and day by a different color in said image storage device.

16. The electronic endoscope according to claim 14, wherein said storing processor stores the year, month, and day displayed by numerals by different colors in said image storage device.

17. The electronic endoscope according to claim 13, wherein said image stored in said image storage device is at least reproduced and displayed on said screen or output as hard copy.

18. The electronic endoscope according to claim 13, wherein said storing processor comprises a character code output processor that outputs a character code corresponding to said date, and a character signal generating processor that generates a character signal in accordance with said character code output by said character code output processor, said character signal being output, along with a video signal corresponding to said object image, to said image storage device, so that said date is stored in said image storage device along with said image.

19. The electronic endoscope according to claim 18, wherein said storing processor outputs said character code in such a manner that one of the year, month, and day, to be differentiated from the others, is displayed in a mode of display which is different from that of the others.

20. An electronic endoscope comprising:
a display processor configured to display a date in an order of at least one of year, month and day; month, day and year; and day, month and year, along with an object image on a screen, wherein the display order can be changed on said screen by a switching operation of the display order; and
a date-differentiating processor that sets the mode of display of the year, month, and day to be displayed by said display processor so as to differentiate at least one of the year, month, and day on said screen, wherein said date-differentiating processor sets one of the year, month, and day to a color different from the others.

21. A data generating device for an electronic endoscope, the data generating device comprising:
an image data generator configured to generate image data corresponding to an object image obtained by the electronic endoscope; and
a date-differentiating processor configured to;
generate character information including a date, such that when the date is displayed on a screen of a display device along with the object image said date-differentiating processor differentiates at least one of year, month and day on the screen by setting one of the year, month, and day to a color different from the other of the year, month and day; and
switchably display, via a switching operation, an order of the displayed date from among the year, month and day; month, day and year; and day, month and year.

22. An electronic endoscope comprising:
a display processor configured to selectively and switchably display, along with an object image on a screen and via a switching operation, an order of a date from among year, month and day; month, day and year; and day, month and year; and
a storing processor configured to:
store the date along with said object image in an image storage device as a single image; and
store the at least one of one of the year, month, and day of the date by a color diferent from a color of the other of the year, month and day in said image storage device.

23. A data generating device, provided in an electronic endoscope, said device generating an image data corresponding to an object image obtained by said electronic endoscope, and character information including a date when said object image is obtained, said device comprising:
a date-differentiating processor that generates said character information so that, when said date is displayed on a screen of a display device along with said object image:
at least one of the year, month, and day is differentiated on said screen, wherein said date-differentiating processor sets one of the year, month, and day to a font different from the other of the year, month and day; and
the date is displayed in an order of at least one of year, month and day; month, day and year; and day, month and year, wherein said display order can be changed on said screen by a switching operation of the display order.

24. An electronic endoscope comprising:
a display processor configured to display a date in an order of at least one of year, month and day; month, day and year; and day, month and year, along with an object image on a screen, wherein said display order can be changed on said screen by a switching operation of the display order; and a storing processor that stores said date along with said object image in an image storage device as a single image;

said storing processor configured to differentiate at least one of the year, month, and day by storing one of the year, month, and day by a from different from the other of the year, month and day in said image storage device.

25. An electronic endoscope comprising:

a display processor configured to display a date in an order of at least one of year, month and day; month, day and year; and day, month and year, along with an object image on a screen; and a date-differentiating processor that sets the mode of display of the year, month, and day to be displayed by said display processor so as to differentiate at least one of the year, month, and day on said screen, wherein said date-differentiating processor sets one of the year, month, and day to a font different from other of the year, month and day wherein said display order can be changed on said screen by a switching operation of the display order.

26. A data generating device for an electronic endoscope, the data generating device comprising:

an image data generator configured to generate image data corresponding to an object image obtained by the electronic endoscope; and a date-differentiating processor configured to;

generate character information including a date, such that when the date is displayed on a screen of a display device along with the object image said date-differentiating processor differentiates at least one of year, month and day on the screen by setting one of the year, month, and day to a font different from the other of the year, month and day; and switchably display, via a switching operation, an order of the displayed date from among the year, month and day; month, day and year; and day, month and year.

27. An electronic endoscope comprising:

a display processor configured to selectively and switchably display, along with an object image on a screen and via a switching operation, an order of a date from among year, month and day; month, day and year; and day, month and year; and a storing processor configured to:

store the date along with said object image in an image storage device as a single image; and store the at least one of one of the year, month, and day of the date by a front different from the other of the year, month and day.

* * * * *